W. A. MARTIN.

Assignor by mesne assignments of one-half Interest to E. H ASHCROFT.

GRATES AND FURNACES.

No. 7,427. Reissued Dec. 12, 1876.

*Witnesses*

Wm. R. Singleton

C. M. Connell

*Inventor*

William Arona Martin

By Blanchard & Singleton

Attorney

N. PETERS, PHOTO-LITHOGRAPHER, WASHINGTON, D. C.

UNITED STATES PATENT OFFICE.

WILLIAM A. MARTIN, OF LONDON, ENGLAND, ASSIGNOR, BY MESNE ASSIGNMENTS, OF ONE-HALF INTEREST TO EDWARD H. ASHCROFT, OF BOSTON, MASSACHUSETTS.

IMPROVEMENT IN GRATES AND FURNACES.

Specification forming part of Letters Patent No. 150,592, dated May 5, 1874; reissue No. 7,427, dated December 12, 1876; application filed November 13, 1876.

DIVISION B.

*To all whom it may concern:*

Be it known that I, WILLIAM ARENA MARTIN, of London, England, civil engineer, have invented certain new and useful Improvements in Furnaces; and I do hereby declare that the following is a full, clear, and exact description thereof, that will enable others skilled in the art to which it appertains to make and use the same, reference being had to the accompanying drawing, and to the letters of reference marked thereon, which form a part of this specification—

Figure 1:
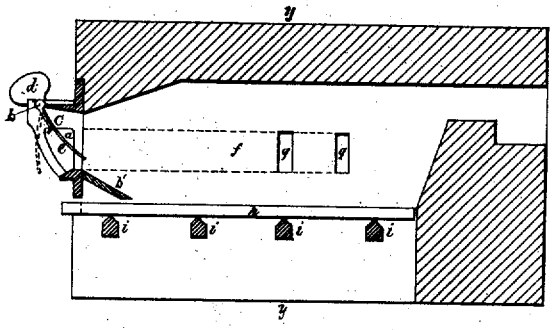
Figure 2:
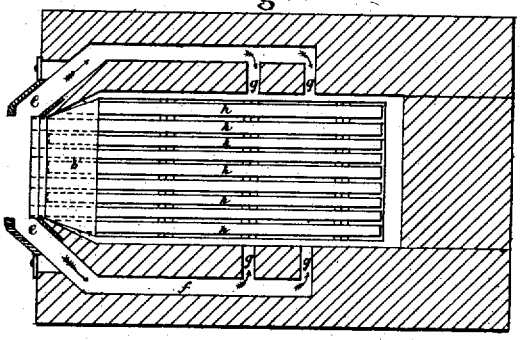
Figure 3:
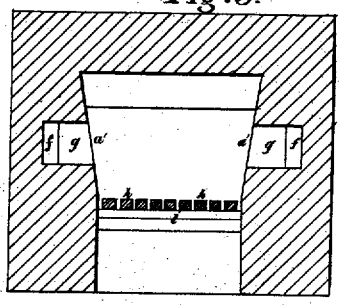

Figure 1 being a horizontal vertical section of my improved furnace, showing the grates in position, the air-passages, the smoke-flue, and the door in position. Fig. 2 is a plan view, showing the grates and the air-passages; and Fig. 3 is a transverse vertical section, showing the form of the cross-section of the furnace, the grates, and the air-passages.

Corresponding letters denote like parts in all of the figures.

This invention relates primarily to furnaces for steam-generators, but is applicable to most kinds of furnaces in which fuel is to be burned; and it consists in the construction of the fire-grates, and in certain combinations, as will be more fully described hereinafter.

In constructing grates in accordance with my improved plan, I make each grate, *h*, of a separate piece of metal, rectangular in form in cross-section, and with square ends projecting through and beyond the front wall of the furnace, in order that they may have a wrench or lever applied to their outer ends for the purpose of turning them over upon their bearers, which owing to the peculiar form thereof, can be done without removing them from their proper places. They being square in form, the stationary ones on each side of the one which is being revolved act as a guide therefor, and thus prevent it from being displaced in turning.

These bars I prefer to make of wrought-iron, to place them upon knife-edged bearers, and to have each alternate one longer than the adjoining one in that part which projects through the wall of the furnace, the latter feature serving to facilitate the application of the wrench or lever for rotating them. Grates thus constructed leave ample space for the passage of air for the support of the combustion of the fuel placed upon them, and are easily turned upon their bearers for the purpose of freeing them from ashes and from any clinker that may gather upon them in use.

The bearers *i i* for these grates are made, preferably, of cast-iron, and are to be provided with resting-places upon the walls of the furnace, across which they extend transversely, and, in order that the grates may revolve freely thereon, their upper edges are beveled so as to form what it termed a knife-edge, as shown in Fig. 1 of the drawing.

The herein-described construction of fire-grates, and their combination with the knife-edged bearers, enable the operator to withdraw any one of them and put it in place again while the furnace is in use, thus making it feasible to remove large pieces of clinker, or to remove and replace a defective grate without extinguishing the fire.

The side air-passages *e e* in the frame of the door connect with horizontal passages *f f* in the wall of the furnace, from which lateral passages *g g* lead into the furnace at points above the upper surface of the grate, the object being to provide for a better distribution of the air to the burning fuel.

Having thus described my invention, what I claim, and desire to secure by Letters Patent, is—

1. The grate-bars *h* of square cross-section, resting upon the upper surface of their bearers, and having their front ends projecting outside of the furnace-wall, substantially as described, whereby they may be revolved upon their bearers, and lifted for the purpose of allowing clinker and ashes to pass down between them without opening the door.

2. The combination of the grate-bars *h*, of square cross-section, and made to revolve each independently of the other, with knife-edged cross-bearers *i*, substantially as and for the purpose set forth.

In testimony that I claim the foregoing I have hereunto set my hand this 23d day of October, 1876.

W. A. MARTIN.

Witnesses:
HENRY J. DARLEY,
H. ALDERTON.